Oct. 25, 1938.   L. N. LAUER   2,134,564
BRAKE
Filed Jan. 25, 1937   2 Sheets-Sheet 2
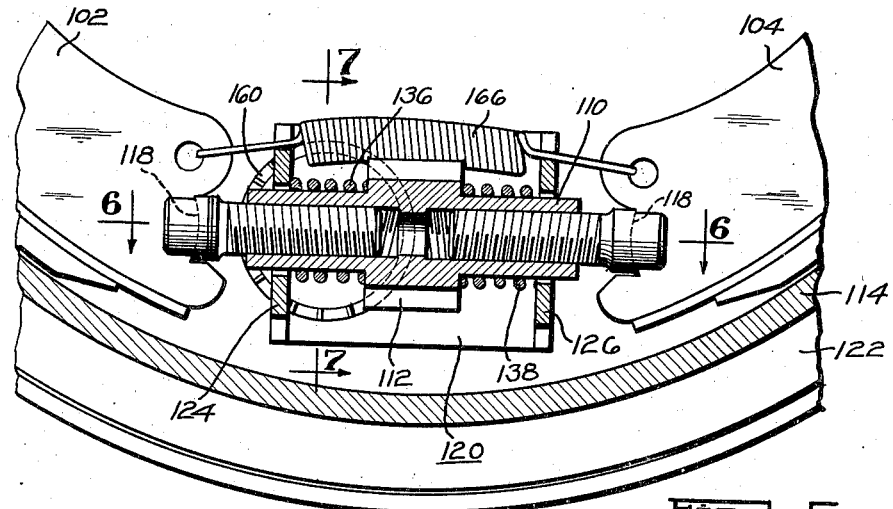
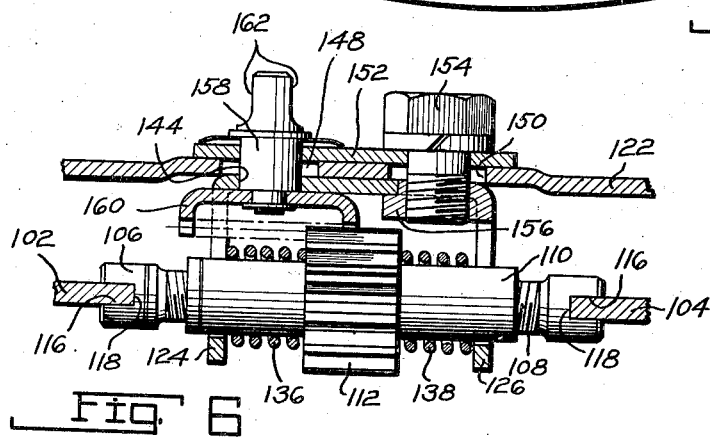
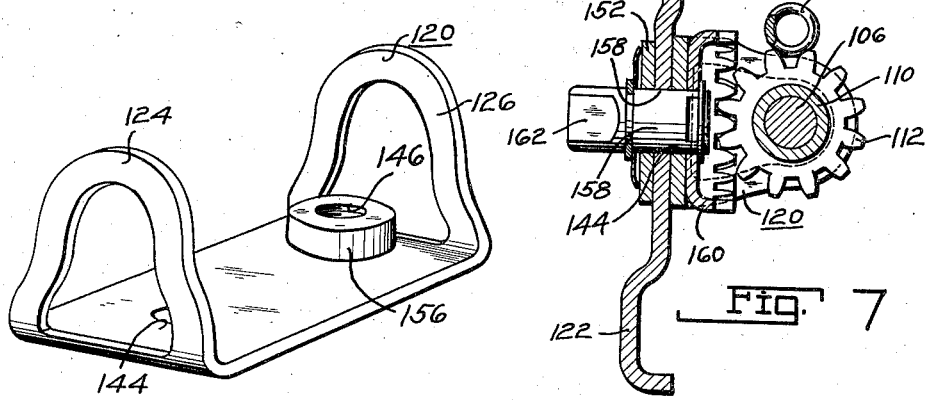
INVENTOR
LEON NICOLAS LAUER
BY *M. W. McConkey*
ATTORNEY Patented Oct. 25, 1938

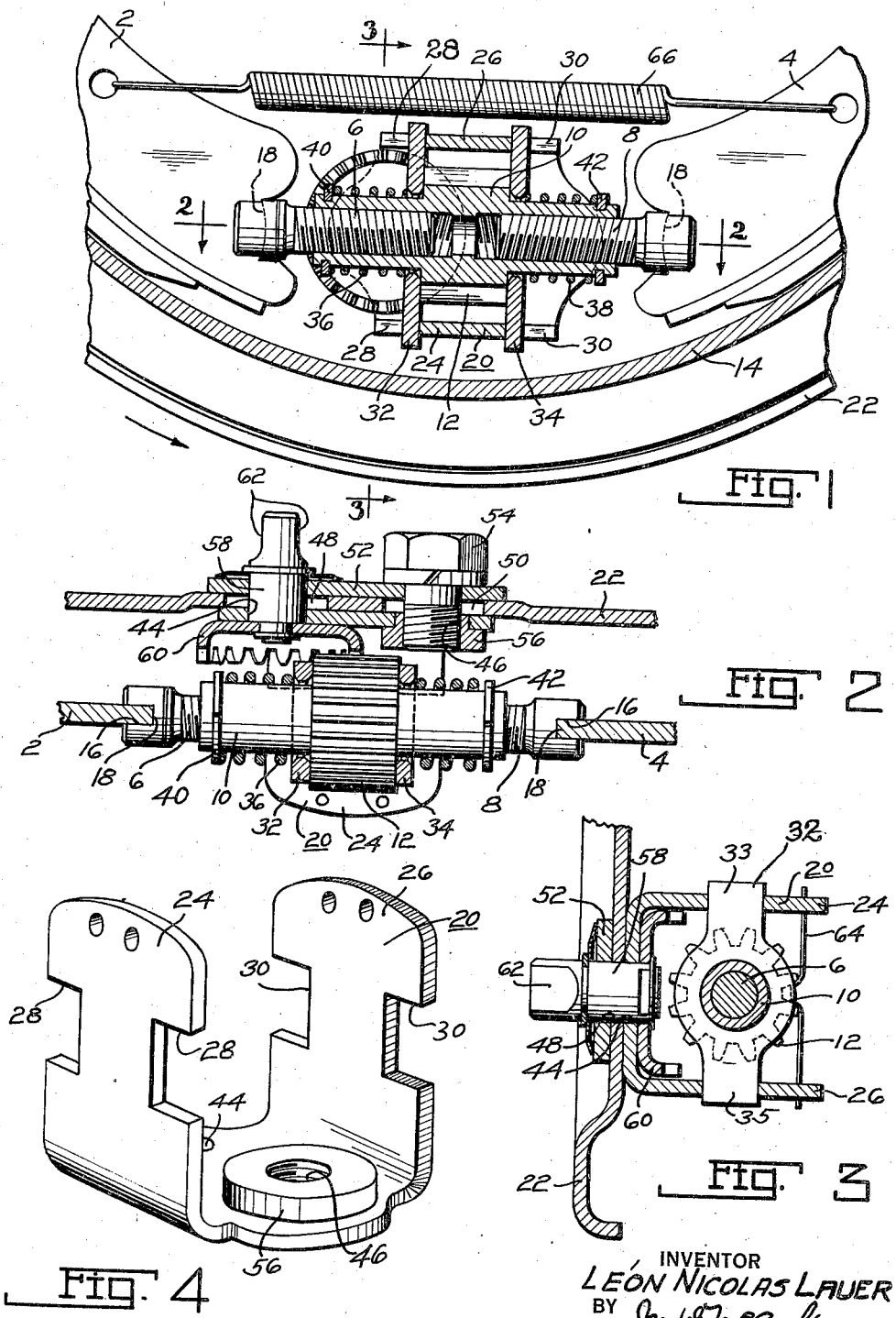

2,134,564

UNITED STATES PATENT OFFICE 2,134,564

BRAKE

Léon Nicolas Lauer, Clichy, France, assignor to Bendix Products Corporation, South Bend, Ind., a corporation of Indiana Application January 25, 1937, Serial No. 122,102
In France February 12, 1936

15 Claims.  (Cl. 188—79.5)

This invention relates to brakes particularly intended for use on automotive vehicles, and is applied to brakes of the self-actuating type in which a shoe, actuated by the applying mechanism, is moved into contact with a drum and is entrained by the drum, and through the medium of an appropriate connecting mechanism acts on another shoe which is thus forced into engagement with the drum.

One of the objects of the invention is to provide a centering device designed to maintain the shoes in a position in which the friction surfaces are centered with relation to the inner surface of the drum, the said shoes being automatically returned to this position each time the brake is released. As a result of the proper centering of the shoes the clearance between the shoes and the drum can be reduced to a minimum, assuring efficient operation of the brake.

An essential element of the invention resides in the centering mechanism being combined with a connecting mechanism inserted between the shoes and which is constituted by a pair of threaded thrust members of opposite pitch threaded in a sleeve having corresponding internal threads, the sleeve being integral with a pinion or similar device which is guided so as to maintain a fixed height from the backing plate.

As an important feature of the invention, the pinion which rotates the sleeve is mounted in a support, preferably U-shaped, on which is also mounted a crown wheel capable of being actuated from outside the brake and which is always maintained by the support in correct mesh with the pinion.

Other objects and desirable particular constructions will be apparent from the following detailed description of two illustrative embodiments shown in the accompanying drawings, in which:

Figure 1 is a partial elevation with parts in section of a brake embodying my invention;

Figure 2 is a section on the line 2—2 of Figure 1;

Figure 3 is a section on the line 3—3 of Figure 1;

Figure 4 is a perspective view of the U-shaped support;

Figure 5 is a view similar to Figure 1 of a modification;

Figure 6 is a section on the line 6—6 of Figure 5;

Figure 7 is a section on the line 7—7 of Figure 5; and

Figure 8 is a perspective view of a U-shaped support used in the embodiment of Figures 5-7.

Referring to the drawings, a shoe 2 is connected to a shoe 4 by means of an expansible thrust member on a connecting mechanism comprising threaded shoe engaging plungers 6 and 8, having threads of opposite pitch, threaded in a sleeve 10 having corresponding internal threads, in such a way that by turning the sleeve (e. g. by means of a pinion 12 integral with the sleeve) the distance between the shoes can be adjusted to maintain the initial clearance between the shoes and the drum 14. The outer ends of the plungers 6 and 8 are provided with grooves 16, preferably rounded, which engage with corresponding rounded parts 18 of the shoes 6 and 8.

The connecting mechanism between the shoes is carried in a U-shaped support 20 which is secured on the backing plate 22 in a manner to be described below.

The U-shaped support 20, shown in perspective in Figure 4, comprises a stamping having two arms 24 and 26 in which are provided notches 28 and 30, the distance between the notches being equal to the thickness of the pinion 12. The planes of the arms 24 and 26 are parallel to the plungers 6 and 8. Mounted in the notches 28 and 30 are spacing washers 32 and 34 provided with diametrically opposed projections 33 and 35. The spacers 32 and 34 are held in place by means of springs numbered 36 and 38 respectively, of equal strength, the ends of which rest against stop rings 40 and 42 secured in notches at the respective ends of the sleeve 10.

The spacers 32 and 34 are provided with holes through which the sleeve 10 passes in such a manner that the pinion 12 is guided at a fixed height from the backing plate.

The stamping forming the U-shaped support 20 is provided with two holes 44 and 46 which are aligned with two slots 48 and 50 formed in the backing plate 22. The support 20 is secured to the backing plate preferably by means of another plate 52 outside the backing plate, and by means of a screw 54 passing through the plate 52, the backing plate, and threaded in a nut 56 riveted in the support 20.

A shaft 58 integral with a crown wheel 60 extends through the hole 44 and the slot 48. The crown wheel 60 is in mesh with the pinion 12 in such a manner that by engaging the flats 62 provided at the end of the shaft 58 by a wrench or key, it is possible to rotate the pinion 12 inside the brake.

The adjusting pinion 12 is yieldingly maintained in a predetermined position by means of a spring 64 inserted in two holes provided in the arms 32 and 34 of the support 20, as shown in Figure 3. The shoes are held in released position by means of a return spring 66 tensioned between them.

To adjust the brake the screw 54 is loosened and the crown wheel 60 is rotated to force the shoes into contact with the drum. The support 20 is thereby moved to its proper position. The screw 54 is then tightened to secure the support 20 in this position, and the crown wheel 60 is rotated in the opposite direction the desired amount to re-establish sufficient clearance between the drum and the shoes.

It will be noticed that whatever the difference of thickness of the brake linings, the crown wheel 60 will always be in the same position with reference to the pinion 12, preferably in the center of the pinion. Also the pinion 12 is guided at a fixed distance from the backing plate and cannot escape from the crown wheel 60 during adjustment.

As a result of the foregoing, when the rotation of the brake drum is in the direction of the arrow, the shoe 2 moves in the direction of the arrow and compresses the spring 36. Likewise when the rotation of the brake drum is in the opposite direction, the spring 38 is compressed. When the brake is released, the shoes will be returned to their initial position by the extension of the respective spring, the spacers 32 and 34 being returned to the bottom of the notches 28 and 30 respectively.

In Figures 5 to 8 inclusive is shown a modification of the invention similar to that described above in which the same elements are designated by the same reference numerals plus 100. This second modification is similar to the first except that the U-shaped support 120 is slightly modified. The support 120 is provided with arms 124 and 126 in planes perpendicular to the sleeve 110. In the arms 124 and 126 are formed openings through which the sleeve 110 passes.

Springs 136 and 138, of equal strength, are mounted in the sleeve 110 and press against the pinion 112 and the arms 124 and 126 respectively of the U-shaped support 120. The pinion 112 is thus held by the support 120 in proper position relative to the backing plate in a manner to insure correct meshing of the pinion with the crown wheel 160. The pinion 112 is yieldingly held in any predetermined position by a spring 166 which is tensioned between the shoes 102 and 104.

The operation of the modification shown in Figures 5 to 8 is identical with that of the mechanism shown in Figures 1 to 4; the same adjustment is effected in an identical manner in the two modifications.

While two illustrative embodiments of the present invention have been described in detail, it is not my intention to be limited by those embodiments, or otherwise than by the terms of the appended claims.

I claim:

1. In a brake for automotive vehicles, a drum, a backing plate, a pair of shoes, a floating expansible thrust member between the shoes, a pinion integral with the thrust member for operating the same, a support adjustably secured to the backing plate and a crown wheel pivoted in the support in engagement with said pinion and having means outside the backing plate for rotating it, said support being constructed and arranged to guide the floating thrust member at a fixed height from the backing plate.

2. In a brake for automotive vehicles, a drum, a backing plate, a pair of shoes, a floating expansible thrust member between the shoes, a pinion integral with the thrust member for operating the same, a support adjustably secured to the backing plate, a crown wheel pivoted in the support in engagement with said pinion and having means outside the backing plate for rotating it, said support being constructed and arranged to guide the floating thrust member, and opposed springs acting between the floating thrust member and the support to return the thrust member to a predetermined position when displaced by operation of the brake.

3. In a brake for automotive vehicles, a drum, a backing plate, a pair of shoes, a floating expansible thrust member between the shoes, a pinion integral with the thrust member for operating the same, a support adjustably secured to the backing plate, and a crown wheel pivoted in the support in engagement with said pinion and having means outside the backing plate for rotating it, said support comprising a U-shaped stamping having arms in planes traversing the thrust member on opposite sides of the pinion and formed with openings through which the thrust member passes.

4. In a brake for automotive vehicles, a drum, a backing plate, a pair of shoes, a floating expansible thrust member between the shoes, a pinion integral with the thrust member for operating the same, a support adjustably secured to the backing plate, a crown wheel pivoted in the support in engagement with said pinion and having means outside the backing plate for rotating it, said support comprising a U-shaped stamping having arms in planes paralleling each side of the floating thrust member formed with notches paralleling the backing plate, and spacers having openings through which the thrust member passes formed with diametrically opposed arms slidably seated in said notches.

5. In a brake for automotive vehicles, a drum, a backing plate, a pair of shoes, a floating expansible thrust member between the shoes, a pinion integral with the thrust member for operating the same, a support adjustably secured to the backing plate, a crown wheel pivoted in the support in engagement with said pinion and having means outside the backing plate for rotating it said support comprising a U-shaped stamping having arms in planes traversing the thrust member on opposite sides of the pinion and formed with openings through which the thrust member passes and a pair of springs each of which is compressed between one of said arms and the thrust member.

6. In a brake for automotive vehicles, a drum, a backing plate, a pair of shoes, a floating expansible thrust member between the shoes, a pinion integral with the thrust member for operating the same, a support adjustably secured to the backing plate comprising a U-shaped stamping having arms in planes paralleling each side of the floating thrust member formed in each edge with opposed notches paralleling the backing plate, spacers having openings through which the thrust member passes formed with diametrically opposed arms slidably seated in said notches, and a pair of opposed springs each compressed between the thrust member and one of said spacers.

7. In a brake for automotive vehicles, a drum, a backing plate, a pair of shoes, a floating expansible thrust member between the shoes, a pinion integral with the thrust member for operating the same, a support adjustably secured to the backing plate comprising a U-shaped stamping having arms in planes paralleling each side of the floating thrust member formed in each edge with opposed notches paralleling the backing plate, spacers having openings through which the thrust member passes formed with diametrically opposed arms slidably seated in said notches, a pair of opposed springs each compressed between the thrust member and one of said spacers and a crown wheel in mesh with said pinion formed with a shaft bearing in said support and extending through the backing plate.

8. In a brake for automotive vehicles, a drum, a backing plate, a pair of shoes, a floating expansible thrust member supported between adjacent shoe ends, a pinion carried by the thrust member for expanding the same, a U-shaped support adjustably secured to the backing plate having arms provided with means guiding the support, and a crown wheel in mesh with the pinion journaled in said support and rotatable from outside the backing plate.

9. In a brake for automotive vehicles, a drum, a backing plate, a pair of shoes, a floating expansible thrust member supported between adjacent shoe ends, said thrust member comprising a sleeve formed at its center with a pinion for rotating the same and a pair of shoe engaging plungers formed with threads of opposite pitch screwed into corresponding internal threads in the sleeve, a U-shaped support adjustably secured to the backing plate having arms guiding the sleeve at a fixed height from the backing plate, and a crown wheel in mesh with the pinion journaled in said support and rotatable from outside the backing plate.

10. In a brake for automotive vehicles, a drum, a backing plate, a pair of shoes, a floating expansible thrust member supported between adjacent shoe ends, said thrust member comprising a sleeve formed at its center with a pinion for rotating the same and a pair of shoe engaging plungers formed with threads of opposite pitch screwed into corresponding internal threads in the sleeve, a U-shaped support adjustably secured to the backing plate having arms guiding the sleeve at a fixed height from the backing plate, a crown wheel in mesh with the pinion journaled in said support and rotatable from outside the backing plate, and opposed springs compressed between said arms and the opposite faces of said pinion.

11. In a brake for automotive vehicles, a drum, a backing plate, a pair of shoes, a floating expansible thrust member supported between adjacent shoe ends, said thrust member comprising a sleeve formed at its center with a pinion for rotating the same and a pair of shoe engaging plungers formed with threads of opposite pitch screwed into corresponding internal threads in the sleeve, a U-shaped support adjustably secured to the backing plate having arms in planes traversing said thrust member formed with openings through which the sleeve passes with the pinion between the arms, and springs compressed between said arms and the opposite faces of the pinion.

12. In a brake for automotive vehicles, a drum, a backing plate, a pair of shoes, a floating expansible thrust member supported between adjacent shoe ends, said thrust member comprising a sleeve formed at its center with a pinion for rotating the same and a pair of shoe engaging plungers formed with threads of opposite pitch screwed into corresponding internal threads in the sleeve, a U-shaped support adjustably secured to the backing plate having arms in planes traversing said thrust member formed with openings through which the sleeve passes with the pinion between the arms, springs compressed between said arms and the opposite faces of the pinion, and a crown wheel in mesh with said pinion having a shaft journaled in said support and extending outside the backing plate.

13. In a brake for automotive vehicles, a drum, a backing plate, a pair of shoes, a floating expansible thrust member supported between adjacent shoe ends, said thrust member comprising a sleeve formed at its center with a pinion for rotating the same and a pair of shoe engaging plungers formed with threads of opposite pitch screwed into corresponding internal threads in the sleeve, a U-shaped support adjustably secured to the backing plate having arms in planes paralleling opposite sides of the thrust member having their edges formed with notches paralleling the backing plate, the bottoms of the notches being spaced apart a distance equal to the width of the pinion, and a pair of spacers formed with openings through which said sleeve passes, one of said spacers being on one side of the pinion and the other on the other side of the pinion, said spacers being provided with diametrically opposite projections slidably seated in said notches.

14. In a brake for automotive vehicles, a drum, a backing plate, a pair of shoes, a floating expansible thrust member supported between adjacent shoe ends, said thrust member comprising a sleeve formed at its center with a pinion for rotating the same and a pair of shoe engaging plungers formed with threads of opposite pitch screwed into corresponding internal threads in the sleeve, a U-shaped support adjustably secured to the backing plate having arms in planes paralleling opposite sides of the thrust member having their edges formed with notches paralleling the backing plate, the bottoms of the notches being spaced apart a distance equal to the width of the pinion, a pair of spacers formed with openings through which said sleeve passes, one of said spacers being on one side of the pinion and the other on the other side of the pinion, said spacers being provided with diametrically opposite projections slidably seated in said notches, abutments formed on the outer ends of the sleeve and coil springs concentric with the sleeve compressed between the abutments and the spacers.

15. In a brake for automotive vehicles, a drum, a backing plate, a pair of shoes, a floating expansible thrust member supported between adjacent shoe ends, said thrust member comprising a sleeve formed at its center with a pinion for rotating the same and a pair of shoe engaging plungers formed with threads of opposite pitch screwed into corresponding internal threads in the sleeve, a U-shaped support adjustably secured to the backing plate having arms in planes paralleling opposite sides of the thrust member having their edges formed with notches paralleling the backing plate, the bottoms of the notches being spaced apart a distance equal to the width of the pinion, a pair of spacers formed with openings through which said sleeve passes, one of said spacers being on one side of the pinion and the other on the other side of the pinion, said spacers being provided with diametrically opposite projections slidably seated in said notches, abutments formed on the outer ends of the sleeve, and coil springs concentric with the sleeve compressed between the abutments and the spacers, and a crown wheel in mesh with the pinion formed with a shaft journaled in said support and extending outside the backing plate.

LÉON NICOLAS LAUER.